United States Patent [19]

Siebert

[11] Patent Number: 4,560,290
[45] Date of Patent: Dec. 24, 1985

[54] HALF BLOCK BEARING ASSEMBLY

[76] Inventor: Craig Siebert, Sleepy Hollow Country Club, Rte. 9, Briarcliff Manor, N.Y. 10510

[21] Appl. No.: 646,842

[22] Filed: Sep. 4, 1984

[51] Int. Cl.[4] .............................................. F16C 35/02
[52] U.S. Cl. ..................................... 384/434; 308/57; 308/54
[58] Field of Search .................. 384/434, 432; 308/57, 308/54, 53

[56] References Cited

U.S. PATENT DOCUMENTS

| | | | |
|---|---|---|---|
| 629,180 | 7/1899 | Taylor | 384/434 |
| 1,449,174 | 3/1923 | Gregg | 308/57 |
| 2,872,253 | 2/1959 | Foote et al. | 384/434 |
| 2,888,301 | 5/1959 | Bachman | 308/54 |

Primary Examiner—Lenard A. Footland
Attorney, Agent, or Firm—Jordan B. Bierman

[57] ABSTRACT

A bearing assembly has a half block bushing for supporting a roller journal thereon, with outer walls having an angular shape which fits into a correspondingly shaped bushing cradle mounted to a mounting bracket. The half block form of the bushing permits convenient manufacture and disassembly of the bearing for replacement of parts, and has longer and more stable wear characteristics. The outer walls of the bushing are preferably trapezoidal to prevent rotational movement of the bushing relative to the cradle and mounting bracket, and to permit easy removal of the bushing during replacement. A spring wire clip lock is used to retain the bushing and cradle in position relative to the mounting bracket by spring pressure.

12 Claims, 7 Drawing Figures

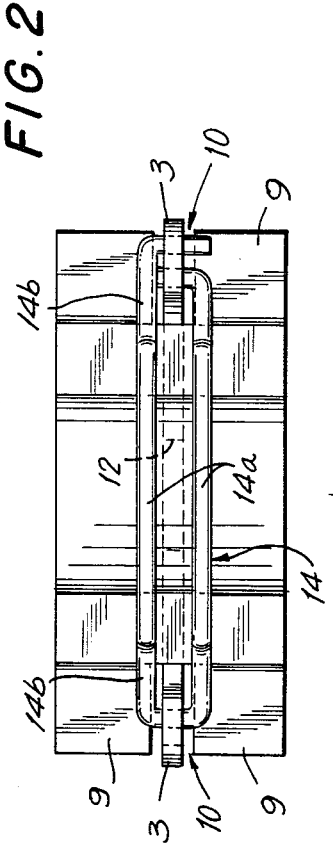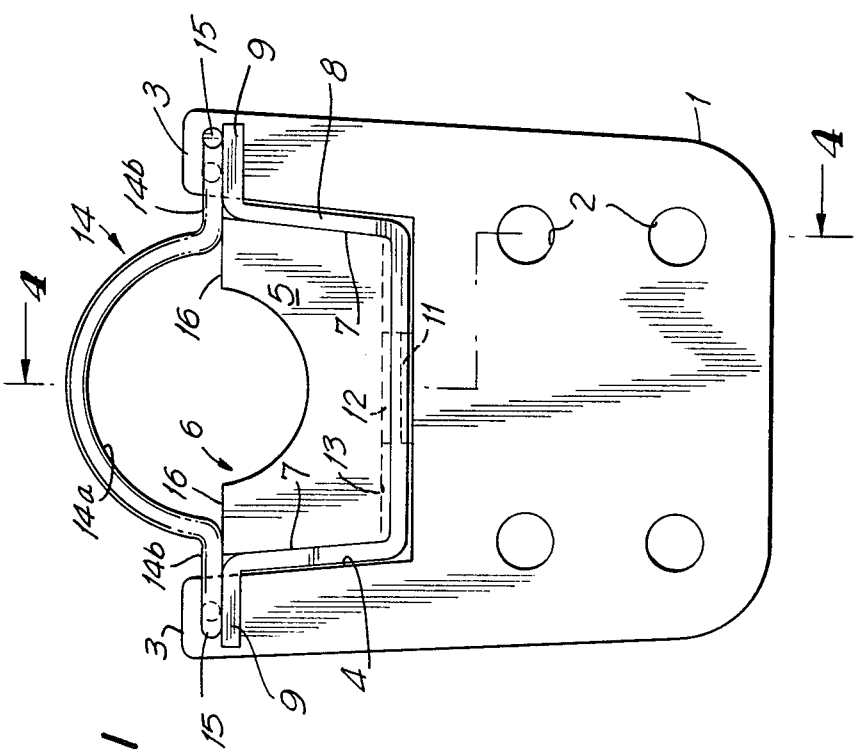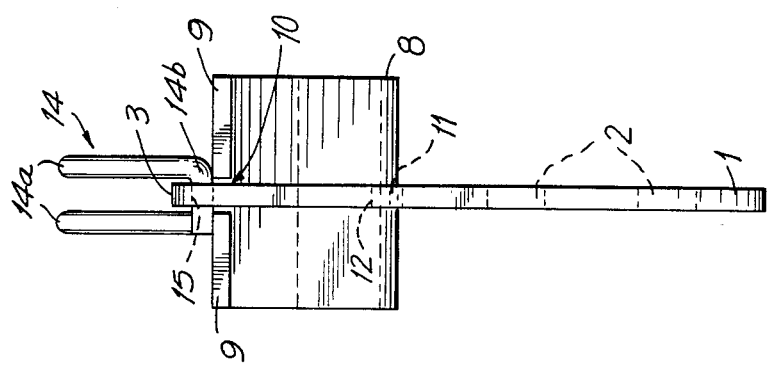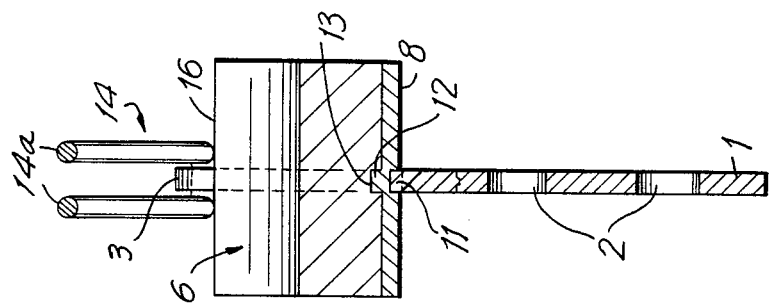

HALF BLOCK BEARING ASSEMBLY

TECHNICAL FIELD

The invention relates to a bearing assembly for supporting rotating shafts and rollers and, more particularly, to a half block bearing assembly.

BACKGROUND ART

In industrial and manufacturing processes, many products require heating at high temperatures, such as 300° F. up to 1000° F., in order to drive off water vapor. Products such as plywood, veneer board, ceiling tile, and gypsum board require drying in large volumes, which is often accomplished in continuously fed, roller-type drying ovens. Typically, the oven temperature is held constant, while the boards are continuously fed through the oven on powered rollers.

Such powered rollers conventionally are held in position by bearing assemblies mounted on an oven frame. Because the oven temperatures are too high for oil or grease lubricated bearings, self-lubricating carbon/graphite bearings are normally used. Because such bearings require periodic replacement, the carbon/graphite material is usually press-fit into a steel sleeve and forms a replaceable cartridge, for example, as shown in U.S. Pat. No. 3,160,449 assigned to Metallized Carbon Corp.

On the driven end of the rollers, a conventional replaceable cartridge has a shroud carrying a bushing split into two halves which can be taken apart during replacement, thus avoiding the need to remove the roller drive chain and sprocket, for example, as shown in U.S. Pat. No. 3,022,126. Another type has a split bearing structure with concentric split bushing halves, as disclosed in U.S. Pat. No. 3,383,142, also assigned to Metallized Carbon Corp. However, because the shroud and carbon/graphite bushing are split, it is not possible to press-fit the bushing into the shroud. As a result, the carbon/graphite bushing is not held securely and may move with the journal. Turning with the journal causes the outside circumference of the carbon/graphite bushing to wear and eventually to fall out of the shroud.

DISCLOSURE OF INVENTION

It is therefore a principal object of the invention to provide a simplified form of replaceable bearing assembly, and to improve the wear life of the replaceable cartridge. In accordance with the invention, a half block bearing assembly comprises a half block bushing for supporting a journal thereon, a bushing cradle for mounting the bushing in a frame, and means for retaining the cradle in a stable, self-aligning manner with respect to the frame. The bushing and cradle have an angular shape and are mounted in a corresponding angular cut-out of the frame, so as to prevent rotation of the bushing and cradle relative to the frame. In a preferred embodiment of the invention, the bushing and cradle have corresponding tapered walls in the form of a rectangle or trapezoid and fit into the correspondingly shaped cut-out of the frame.

The mounting bracket has holes for retaining means, preferably in the form of a spring wire clip lock, which is removeably secured through the holes and presses down by spring pressure upon the top of the bushing. The cradle fits in the cut-out of the frame and has lateral flanges on each side having slots into which upwardly extending mounting portions of the frame are inserted. The cradle is also prevented from rotation or longitudinal movement by a tab on the frame which fits into a corresponding recess in the bottom of the cradle. Similarly, the bushing is held in place axially by a protrusion from the lower wall of the cradle which fits into a corresponding slot in the bottom of the bushing. The bushing is held in place in the cradle by the weight of the roller and by the spring wire clip lock, which loops through the hole on one side of the frame and terminates with 90° bends at its ends which are opened and closed through the hole at the other side of the frame.

The half block bushing assembly of the invention has the following advantages over prior bearing assemblies for roller-type dryer ovens. It will not rotate with the journal because of its trapezoidal or rectangular block shape. Further, the bushing will not fall out of its holder even if worn, because of the spring pressure of the clip lock. Carbon/graphite material can be saved because the top half of the bushing is omitted, and more carbon/graphite material is available for wear in the bottom half block under the journal. The half block bushing is simpler to manufacture and replace because it has no metal sleeve into which it must be press-fitted, and because replacement requires simply removing the spring wire clip lock and the worn bushing.

BRIEF DESCRIPTION OF THE DRAWINGS

The above features and the further advantages of the invention are described in detail below in conjunction with the accompanying drawings, of which:

FIG. 1 is a front sectional view of the bearing assembly in accordance with the present invention;

FIG. 2 is a plan view of the bearing assembly of FIG. 1;

FIG. 3 is a side elevational view of the bearing assembly of FIG. 1;

FIG. 4 is a side cross-sectional view of the bearing assembly of FIG. 1 taken along view line 4—4;

DETAILED DESCRIPTION OF PREFERRED EMBODIMENTS

Figure 6:
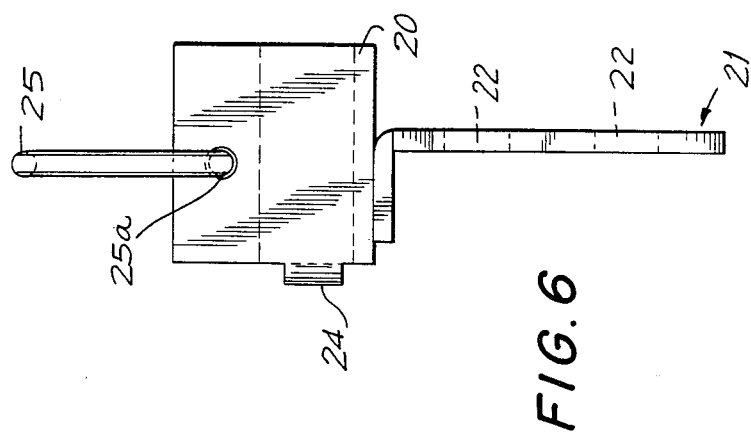
FIG. 6 is a side cross-sectional view of the bearing assembly of FIG. 5.

Referring to the embodiment shown in FIGS. 1–4, frame or mounting bracket 1 has a lower section with mounting holes 2 for securing bracket 1 to a conventional dryer oven roller frame (not shown). The upper portion of bracket 1 has upwardly extending mounting tabs 3 and a rectangular or trapezoidal cut-out section in the center part thereof generally indicated by reference numeral 4.

Half block bushing 5 has semi-circular indentation 6 for supporting a journal (not shown) thereon. The outer walls of the bushing, indicated by reference numeral 7, are rectangular or trapezoidal in shape corresponding to cut-out 4 in bracket 1. Bushing 5 rests snugly in cradle 8, which has a shape corresponding to bushing 5 and cut-out 4 of bracket 1. At the upper ends of cradle 8 are laterally extending flanges 9, which have slots 10 for receiving tabs 3 to secure cradle 8 to bracket 1. The fit of the walls of cradle 8 within cut-out 4 fixes its position in the downward direction and prevents its rotation under the force of the turning journal. Protrusion 11 on bracket 1 located in a central portion of cut-out 4 fits into a corresponding recess in the lower wall of cradle 8, and protrusion 12 on the lower wall of cradle 8 is inserted into corresponding central slot 13 formed in the bottom wall of bushing 5.

Spring wire clip lock 14 is an integral length of wire formed with double semi-circular arch sections 14a and loop sections 14b which are secured into holes 15 formed in mounting tabs 3 of mounting bracket 1. The ends of semi-circular arch portions 14a rest upon top walls 16 on both sides of bushing 5 with a spring-biased force, when the clip lock 14 is secured in place as shown in the drawings. Arch portions 14a provide sufficient clearance so as not to contact the journal supported on bushing 5, and are adapted to retain the journal on the bushing in the event of any unusual vibrations or vertical movements. One of the loop portions 14b is continuous and is inserted through hole 15 on one side, whereas the other loop portion is discontinuous and constitutes the ends of clip lock 14 terminating adjacent each other with 90° bends, as shown on the right hand side of mounting tab 3 in FIG. 1. The clip lock as a whole is retained in pressing contact with lateral flanges 9 of cradle 8 and top walls 16 of bushing 5 by the spring force of the clip lock. When it is desired to remove clip lock 14 for replacement of parts of the bearing assembly, the terminating ends are moved apart from hole 15 so that clip lock 14 may be rotated or removed from its retaining position.

It is desirable to use bushing cradle 8 since it holds half block bushing 5 securely wedged in compression, so as to help prevent cracking of the carbon/graphite material. The tapered shape of the bushing and cradle insures that the bushing can be easily removed from the cradle for replacement. The interlocking of mounting tabs 3 of mounting bracket 1 in slots 10 of lateral flanges 9 of cradle 8 allows the assembly to be self-aligning in the horizontal and vertical directions. Protrusion 11 of mounting bracket 1 and protrusion 12 of cradle 8 also insure that the assembly is secured stably in the horizontal as well as lateral directions. The clip lock secures the bearing assembly and allows for convenient disassembly and replacement of the bushing or other parts. In addition, the design of the above described clip lock allows it to remain secured at one end to mounting bracket 1 even during a replacement operation.

Figure 5:
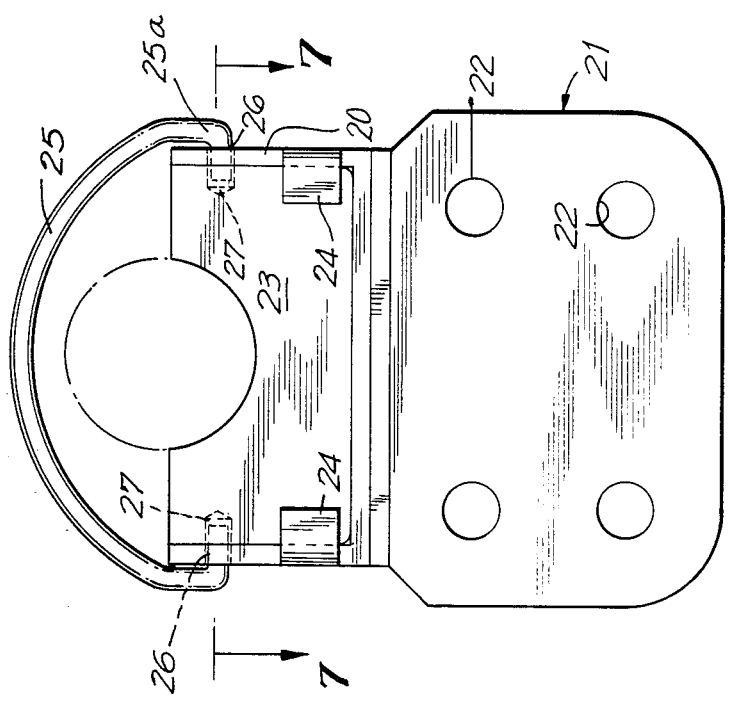
FIG. 5 is a front sectional view of another embodiment of the bearing assembly of the invention.
Figure 7:
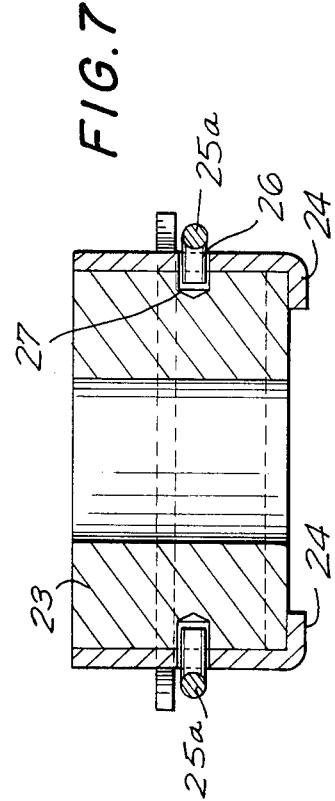
FIG. 7 is a plan sectional view of the bearing assembly of FIG. 5 taken along view line 7—7.

Another form of half block bushing assembly according to the invention is shown in FIGS. 5–7. In this form of the bearing assembly, bushing cradle 20 is formed integrally with mounting bracket 21. Holes 22 are provided for securing mounting bracket 21 to the roller frame as used in dryer ovens and other roller transport systems in high temperature environments. Half block bushing 23 has a rectangular form and is retained in position by the side and lower walls of cradle 20 and front tabs 24. Spring wire clip lock 25 has a central arch portion, providing clearance over a journal (indicated by phantom lines) supported on bushing 23, and has its ends 25a secured in holes 26 of cradle 20 and in recesses 27 of bushing 23 aligned therewith. Clip lock 25 applies a compression spring force to retain ends 25a in cradle 20 and bushing 23.

The half block bearing assembly of the invention has significant advantages in ease and convenience of manufacture and replacement. Use of the half block bushing eliminates the need for an upper half, as compared to a split bushing, or press-fitting the split bushing in a sleeve. The half block bushing assembly of the first embodiment is self-aligning, and the working surface of the bushing remains useable and stable despite prolonged wear.

The half block form is also stable under compression by the weight of the journal and by the retaining walls of the bushing cradle. More carbon/graphite material can be made available for wear under the journal, for example, over 0.5 inches as compared to about 0.25 inches for conventional split bushings. Moreover, the open thrust face of the bushing allows it to be made as long as the roller frame design will permit. Longer bushings reduce the load per square inch of journal and increase wear life. The open thrust face also simplifies the manufacture of the half block bushing and reduces length tolerance requirements. The design of the clip lock of the described bearing assembly provides a simple means of retaining the bushing in position, and for disassembling the bearing for replacement of any component thereof.

The above described embodiments are merely illustrative of and not intended to limit the scope of the invention. Various modifications and substitutions of elements, materials, and order or position of elements may be made without departing from the spirit of the invention. All such modifications and variations are intended to be encompassed within the invention as defined in the following claims.

What is claimed is:

1. A bearing assembly comprising a mounting bracket; a bushing cradle mounted on said bracket and having walls defining a recess; a half block bushing having an indentation in one wall for supporting the journal therein, and other walls having a shape corresponding to the shape of the recess of said cradle, said half block bushing being stably positioned by said other walls in the recess of said cradle; and removable retaining means for securing said bushing in position relative to said cradle and said bracket.

2. The half block bearing assembly as described in claim 1, wherein said cradle is a unit removable from its mounting position in said bracket, and has means for maintaining itself in said mounting position in alignment with said journal under rotation of said journal on said bushing.

3. The half block bearing assembly as described in claim 1, wherein said mounting bracket has mounting portions extending upwardly on two sides, and said cradle has laterally extending flanges on two sides, each flange having a slot into which a corresponding one of said upwardly extending mounting portions is interlocked to secure said cradle in position relative to said bracket.

4. The half block bearing assembly as described in claim 3, wherein said mounting portions of said mounting bracket have retaining holes formed therein adjacent the positions of said lateral flanges, and said retaining means is a spring wire clip lock which loops through said holes for retaining said cradle and said bushing in position relative to said mounting bracket.

5. The half block bearing assembly as described in claim 4, wherein said spring wire clip lock has double semi-circular arch portions providing clearance over a journal supported on said bushing, and laterally extending loop portions for insertion in said holes of said mounting portions, said loop portions being positioned to exert a spring pressure force on said cradle and said bushing.

6. The half block bearing assembly as described in claim 5, wherein said spring wire clip lock has terminating ends formed as 90° bends adjacent each other and are retained in the hole of one of said mounting portions by a spring pressure force.

7. The half block bearing assembly as described in claim 3, wherein said cradle has a lower wall having an recess in a central portion thereof, and said mounting bracket has a protrusion which is located in said recess to secure said cradle in position relative to said bracket.

8. The half block bearing assembly as described in claim 3, wherein a lower wall of said cradle has a protrusion extending upwardly from a central portion thereof, and said bushing has a slot into which said protrusion is inserted for retaining said bushing in position relative to said cradle.

9. The half block bearing assembly as described in claim 1, wherein said other walls of said bushing and the walls of said cradle have corresponding trapezoidal shapes.

10. The half block bearing assembly as described in claim 1, wherein said bushing is made of a carbon/graphite material.

11. The half block bearing assembly as described in claim 1, wherein said cradle is fixedly mounted in said bracket.

12. The half block bearing assembly as described in claim 11, wherein said cradle has retaining holes formed in side walls thereof, said bushing has retaining recesses formed in side walls thereof aligned with said retaining holes, and said retaining means is a spring wire element having ends inserted in said cradle holes and bushing recesses under a spring compression force.

* * * * *